(12) United States Patent
Yamanaka

(10) Patent No.: US 9,530,185 B2
(45) Date of Patent: Dec. 27, 2016

(54) IMAGE PROCESSING APPARATUS, IMAGING APPARATUS, IMAGE PROCESSING METHOD AND STORAGE MEDIUM

(71) Applicant: CANON KABUSHIKI KAISHA, Tokyo (JP)

(72) Inventor: Yohei Yamanaka, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/694,877

(22) Filed: Apr. 23, 2015

(65) Prior Publication Data

US 2015/0310588 A1 Oct. 29, 2015

(30) Foreign Application Priority Data

Apr. 25, 2014 (JP) .................................. 2014-091958

(51) Int. Cl.
G06T 3/40 (2006.01)
H04N 9/07 (2006.01)
H04N 9/04 (2006.01)

(52) U.S. Cl.
CPC ............. *G06T 3/4015* (2013.01); *H04N 9/045* (2013.01); *H04N 9/07* (2013.01)

(58) Field of Classification Search
CPC .................................. H04N 9/07; G06T 3/4015
See application file for complete search history.

(56) References Cited

U.S. PATENT DOCUMENTS

| 5,886,745 A * | 3/1999 | Muraji ................... H04N 5/145 348/448 |
| 7,123,781 B2 * | 10/2006 | Maenaka .............. G06T 3/4007 382/266 |
| 2010/0265352 A1 | 10/2010 | Nashizawa | |
| 2010/0302416 A1 * | 12/2010 | Kawashima ............ G06T 5/002 348/246 |
| 2011/0069192 A1 | 3/2011 | Sasaki | |
| 2013/0093925 A1 | 4/2013 | Nashizawa | |
| 2015/0310589 A1 | 10/2015 | Yamanaka | |

(Continued)

FOREIGN PATENT DOCUMENTS

CN 101336438 A 12/2008
CN 101480057 A 7/2009

(Continued)

*Primary Examiner* — James Hannett
(74) *Attorney, Agent, or Firm* — Canon USA, Inc. I.P. Division

(57) ABSTRACT

At least one image processing apparatus is provided which allows performing a demosaicing process on a polychrome image signal with high accuracy. The at least one image processing apparatus performs an interpolation process in each of a plurality of defined directions on a mosaic image signal and acquires an evaluation value representing a correlation in each of a horizontal direction and a vertical direction for each of a plurality of pixels of the image signal having undergone the interpolation process. The evaluation values for at least one pixel of interest are corrected based on the evaluation values for peripheral pixels if a predetermined condition including a condition that it is determined that the at least one pixel of interest is an isolated point is satisfied. Then, the image signal after the at least one pixel of interest is interpolated based on the corrected evaluation values.

9 Claims, 17 Drawing Sheets

(56) References Cited

U.S. PATENT DOCUMENTS

2015/0312551 A1* 10/2015 Hosaka .............. H04N 13/0239
348/49

FOREIGN PATENT DOCUMENTS

| CN | 101902548 A | 12/2010 |
|---|---|---|
| EP | 1289310 A2 | 3/2003 |
| JP | 2008-035470 A | 2/2008 |

* cited by examiner

FIG. 4

| R11 | G12 | R13 | G14 | R15 | G16 |
|-----|-----|-----|-----|-----|-----|
| G21 | B22 | G23 | B24 | G25 | B26 |
| R31 | G32 | R33 | G34 | R35 | G36 |
| G41 | B42 | G43 | B44 | G45 | B46 |
| R51 | G52 | R53 | G54 | R55 | G56 |
| G61 | B62 | G63 | B64 | G65 | B66 |

FIG. 10

| h11 | h12 | h13 | h14 | h15 |
|-----|-----|-----|-----|-----|
| h21 | h22 | h23 | h24 | h25 |
| h31 | h32 | h33 | h34 | h35 |
| h41 | h42 | h43 | h44 | h45 |
| h51 | h52 | h53 | h54 | h55 |

FIG. 12

| h11<br>1 | h12<br>2 | h13<br>ISOLATED |
|---|---|---|
| h21<br>3 | h22<br>ISOLATED | h23<br>4 |
| h31<br>ISOLATED | h32<br>ISOLATED | h33<br>5 |

ISOLATED: PIXEL PROVISIONALLY
DETERMINED AS ISOLATED POINT

| 0 | 0 | 0 | 0 | 0 |
|---|---|---|---|---|
| 0 | 0 | 0 | 0 | 0 |
| 1 | 1 | 1 | 1 | 1 |
| 0 | 0 | 0 | 0 | 0 |
| 0 | 0 | 0 | 0 | 0 |

| 0 | 0 | 1 | 0 | 0 |
|---|---|---|---|---|
| 0 | 0 | 1 | 0 | 0 |
| 0 | 0 | 1 | 0 | 0 |
| 0 | 0 | 1 | 0 | 0 |
| 0 | 0 | 1 | 0 | 0 |

| 1 | 0 | 0 | 0 | 0 |
|---|---|---|---|---|
| 0 | 1 | 0 | 0 | 0 |
| 0 | 0 | 1 | 0 | 0 |
| 0 | 0 | 0 | 1 | 0 |
| 0 | 0 | 0 | 0 | 1 |

| 0 | 0 | 0 | 0 | 1 |
|---|---|---|---|---|
| 0 | 0 | 0 | 1 | 0 |
| 0 | 0 | 1 | 0 | 0 |
| 0 | 1 | 0 | 0 | 0 |
| 1 | 0 | 0 | 0 | 0 |

FIG. 17
PRIOR ART

| R | G | R | G |
|---|---|---|---|
| G | B | G | B |
| R | G | R | G |
| G | B | G | B |

IMAGE PROCESSING APPARATUS, IMAGING APPARATUS, IMAGE PROCESSING METHOD AND STORAGE MEDIUM

BACKGROUND OF THE INVENTION

Field of the Invention

The present inventions relate to image processing, and particularly relate to a technology for demosaicing by interpolating a color signal missing in each pixel in a polychrome image signal.

Description of the Related Art

In the past, a color filter having a Bayer pattern as illustrated in FIG. 17 has been applied in a single-plate image pickup device such as a CCD and a CMOS sensor. In this case, such a color filter may generally be a filter for three primary colors of Red, Green, and Blue or three complementary colors of Cyan, Magenta, and Yellow.

However, because a signal corresponding to one color in each pixel may be acquired by using the Bayer pattern, a process is performed for demosaicing (interpolating) color signals of the other two colors missing in each pixel. Many demosaicing methods have been known in the past, and basic demosaicing methods may include bilinear and bicubic interpolations, for example.

Though a good interpolation result may be acquired from an image containing many low frequency components by a bilinear or bicubic interpolation, a line and color, called a spurious resolution and a false color (color moire), which do not exist in an actual subject may occur in an image containing high frequency components. Such a spurious resolution and a false color may occur because of demosaicing by using pixels in a different direction from an edge direction that a subject image originally has.

Accordingly, a method has been proposed which may sufficiently inhibit occurrence of a spurious resolution and a false color by demosaicing by using pixels along an edge direction that a subject image originally has. Such demosaicing methods using pixels along an edge direction may be roughly divided into two methods. Japanese Patent Laid-Open No. 2008-035470 proposes a method including identifying an edge direction by using peripheral pixels and performing an interpolation along the edge instead of interpolation across the edge.

Japanese Patent Laid-Open No. 2008-035470 discloses a second interpolation method including first performing an interpolation in each direction to generate several kinds of interpolation results and then determining and selecting which direction used for interpolation may provide an appropriate result. The determination of the appropriateness of an interpolation direction may be based on an evaluation value indicating a peripheral similarity which is neighborhood homogeneity or uniformity of peripheral pixels including a pixel to be interpolated. A direction having a high homogeneity may be determined, and may be selected as the edge direction.

However, the methods disclosed in Japanese Patent Laid-Open No. 2008-035470 may not provide an appropriate evaluation value indicating homogeneity or uniformity near a resolution limit where a pixel pitch of an imaging sensor and a pitch of a fine part of a subject are close or matched. Thus, an appropriate interpolation direction may not be selected, and a spurious resolution may therefore occur.

SUMMARY OF THE INVENTION

One aspect of one or more embodiments of the present inventions provides at least one image processing apparatus including an interpolation unit configured to perform an interpolation process in each of a plurality of defined directions on a mosaic image signal generated by an image pickup device which outputs an image signal corresponding to one of colors of a plurality of color filters for each pixel, an evaluation unit configured to acquire an evaluation value representing a correlation for each of the defined directions for each of pixels of the image signal having undergone the interpolation process by the interpolation unit, an output unit configured to correct the evaluation values for at least one pixel of interest (e.g., when each pixel is processed (as a pixel of interest in each iteration of the process) for a plurality of pixels, at least one pixel of interest or a plurality of pixels of interest may be processed) based on the evaluation values for peripheral pixels of the at least one pixel of interest if the at least one pixel of interest satisfies a predetermined condition including a condition that the at least one pixel of interest is an isolated point, and to output an image signal after the at least one pixel of interest is interpolated based on the corrected evaluation values.

According to other aspects of the present inventions, one or more image processing apparatuses, one or more imaging apparatuses, one or more image processing methods, one or more programs and one or more storage mediums are discussed herein. Further features of the present inventions will become apparent from the following description of exemplary embodiments with reference to the attached drawings.

BRIEF DESCRIPTION OF THE DRAWINGS

FIG. 4 is a diagram illustrating a pixel layout configuration of a Bayer pattern for explaining an interpolation process for each direction.

FIG. 10 is a diagram for explaining the embodiment of the correlation determination process which handles pixel(s) with an H-direction evaluation value.

FIG. 12 is a diagram for explaining an example of a correction in the embodiment of the isolated-point correction process.

FIG. 17 illustrates a pixel layout configuration of a Bayer pattern.

DESCRIPTION OF THE EMBODIMENTS

Exemplary embodiments of the present inventions will be described in detail with reference to the attached drawings.

First Exemplary Embodiment

Figure 1:
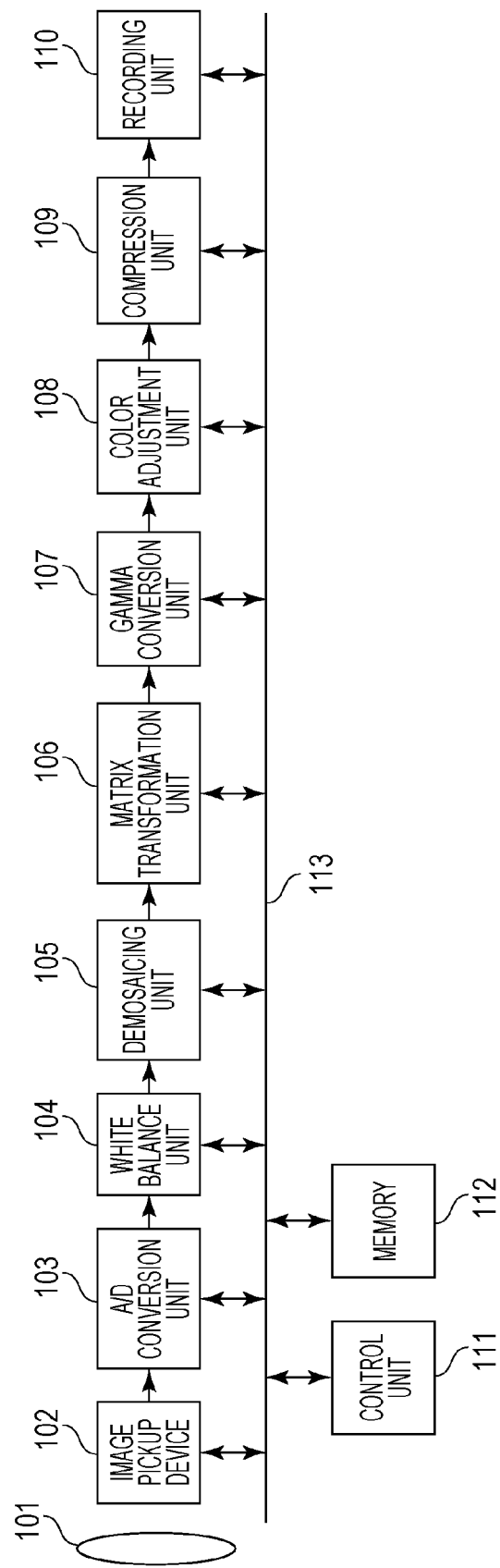
FIG. 1 is a block diagram illustrating a schematic configuration of an imaging apparatus according to at least first and second embodiments.

FIG. 1 is a block diagram illustrating a schematic configuration of an image processing apparatus according to a first exemplary embodiment of the present inventions. The image processing apparatus may be an imaging apparatus, such as a digital camera and a digital video camera, in the following descriptions.

An optical image (subject image or object image) reflecting a subject or object is formed on an image pickup device 102 through an imaging lens 101 and is photoelectrically converted.

The image pickup device 102 is configured as a single-plate image pickup device including general three-primary-color filters. The three-primary-color filters are for R (Red), G (Green), and B (Blue) having transmission dominant wavelength bands around 650 nm, 550 nm, and 450 nm, respectively, and may generate a color plane corresponding to each band of the three primary colors.

Figure 17:
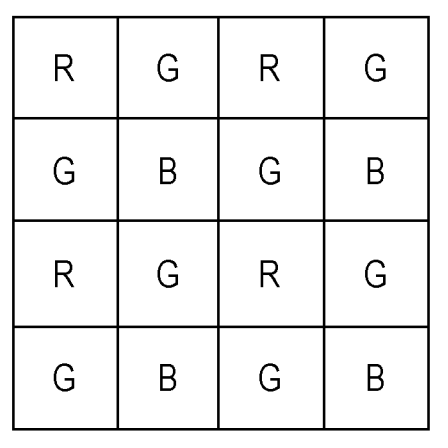

The single-plate polychrome image pickup device has color filters corresponding to the plurality of colors. The color filters may be spatially arranged for each pixel as illustrated in FIG. 17. In each of the pixels, with the color filters being in such an arrangement as shown in FIG. 17, a light intensity on a single color plane may only be acquired. Thus, the image pickup device 102 outputs a mosaic image signal, that is, an image signal missing two colors of the three primary colors in each pixel. An analog-digital (A/D) conversion unit 103 converts the mosaic image signal output as analog voltage from the image pickup device 102 to polychrome digital image data.

A white balance unit 104 performs a white balance process. More specifically, a gain is applied to each of R, G, and B such that R, G, and B in a region supposed to be white may be matched.

A demosaicing unit 105 interpolates polychrome mosaic image data of two colors missing within the three primary colors in each pixel to generate a polychrome image having all R, G, B polychrome image data in all pixels.

The polychrome image data in each pixel may undergo a matrix transformation process in a matrix transformation unit 106 and may undergo a gamma correction process in a gamma conversion unit 107. As a result, basic polychrome image data is generated.

A color adjustment unit 108 performs a process for improving image appearance or quality on the basic polychrome image data. For example, the color adjustment unit 108 may perform color adjustment processes, such as noise reduction, color saturation emphasis, hue correction, edge emphasis, etc. A compression unit 109 compresses the color-adjusted polychrome image data by a method, such as into a JPEG format, to reduce the data size in recording.

Those processing operations performed by the devices including the image pickup device 102 to the compression unit 109 are controlled by a control unit 111 through a bus 113. For the control, the control unit 111 may use a memory 112 as required. The digital image data compressed by the compression unit 109 are recorded or stored in a recording or storage medium, such as a flash memory, by a recording or storage unit 110 under control of the control unit 111.

Next, the demosaicing process in the demosaicing unit 105 will be described with reference to FIG. 2. The demosaicing unit 105 first performs an interpolation process on a pixel of interest (or at least one pixel of interest, e.g., when each pixel is processed (as a pixel of interest in each iteration of the process) for a plurality of pixels, at least one pixel of interest or a plurality of pixels of interest may be processed) in a plurality of defined directions by using surrounding or peripheral pixels thereof, and then selects a direction so that a polychrome image signal of R, G, B three primary colors is generated as an interpolation process result for each of the pixels (e.g., the interpolation may occur iteratively on a pixel-by-pixel basis).

More specifically, an H-direction interpolation unit 202 and a V-direction interpolation unit 203 interpolate pixel data of colors missing in a horizontal (H) direction and a vertical (V) direction on input Bayer image data 201 to generate R, G, B image data in the H-direction and V-direction of each of the pixels. Next, an H-direction degree-of-dispersion calculation unit 204 and a V-direction degree-of-dispersion calculation unit 205 calculate respective degrees of dispersion for each of the pixels on the R, G, B image data in each of the pixels after the interpolation processes in the horizontal direction and vertical direction of each of the pixels.

An evaluation value calculation unit 206 calculates direction evaluation values from the degrees of dispersion of the horizontal direction and vertical direction. Based on an output result from the evaluation value calculation unit 206, an isolated point determination unit 207 performs isolated point determination on the evaluation values for each of the pixels. After the isolated point determination, a correlation determination unit 208 performs a correlation determination process on the evaluation values, and an isolated point correction unit 209 corrects the isolated point by using results of the isolated point determination and correlation determination on the evaluation values.

An image generation unit 210 compares a final evaluation value for the horizontal direction and a final evaluation value for the vertical direction, and selects a direction with a higher evaluation value from the horizontal direction and the vertical direction. The image generation unit 210 then generates final interpolated image data based on the R, G, B image data after the interpolation process for the selected direction, and outputs interpolated RGB image data 211 as demosaicing data.

Figure 3:
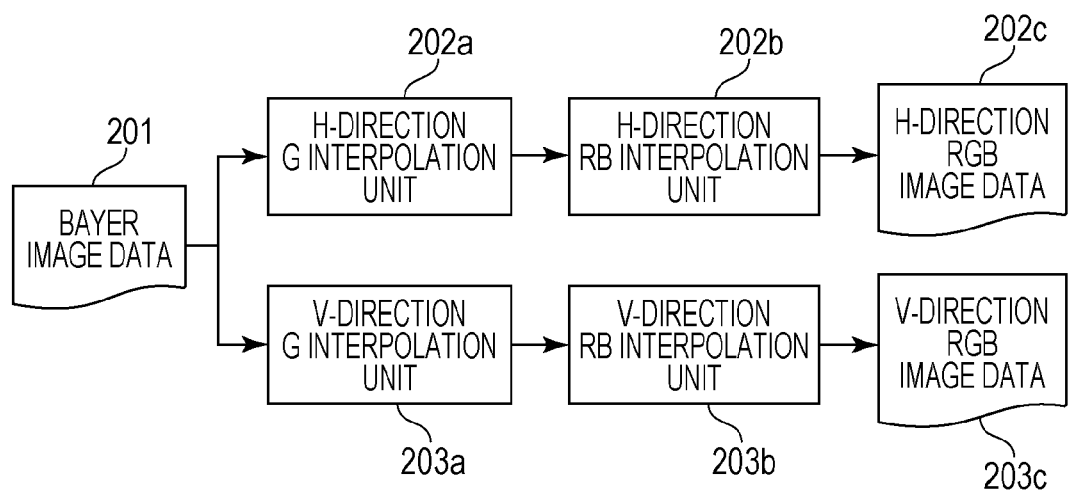
FIG. 3 is a block diagram illustrating configurations of at least one embodiment of an H-direction interpolation unit and at least one embodiment of a V-direction interpolation unit in the demosaicing unit in FIG. 2.

The interpolation process performed by at least one embodiment of the H-direction interpolation unit 202 and at least one embodiment of the V-direction interpolation unit 203 for the corresponding directions will be described with reference to FIG. 3. As illustrated in FIG. 3, the H-direction interpolation unit 202 has an H-direction G interpolation unit 202a and an H-direction RB interpolation unit 202b, and the V-direction interpolation unit 203 has a V-direction G interpolation unit 203a and a V-direction RB interpolation unit 203b. In the H-direction interpolation unit 202, the H-direction G interpolation unit 202a first interpolates a G signal (data) in a high frequency band, and the H-direction RB interpolation unit 202b next interpolates R, B data. Also in the V-direction interpolation unit 203, the V-direction G interpolation unit 203a first interpolates G data in a high frequency band, and the V-direction RB interpolation unit 203b next interpolates R, B data. As a result, the H-direction interpolation unit 202 generates H-direction RGB image data 202c, and the V-direction interpolation unit 203 generates V-direction RGB image data 203c.

Next, a specific interpolation method will be described with reference to FIG. 4. For the interpolation of G color, when a pixel of interest is a pixel associated with a G color filter (or a G filter color), G data of the pixel is directly output (Expression (1) shown below). In order to interpolate a G color for a pixel associated with an R color filter (or an R filter color) and/or a pixel associated with a B color filter (or a B filter color), Expression (2) and Expression (3) are used for the H-direction and the V-direction, respectively, to calculate corresponding interpolation data. G33, G34, G43, G44 in Expressions (1), (2), and (3) correspond to pixel codes or symbols which are illustrated in FIG. 4 for convenience (and discussed further in the following description). For example, G33 indicates G data after the interpolation in a pixel having R33 data (e.g., in a pixel R33) in FIG. 4, and G44 indicates G data after the interpolation in a pixel having B44 data (e.g., in a pixel B44) in FIG. 4, etc.

$$\begin{cases} G34 = G34 \\ G43 = G43 \end{cases} \quad (1)$$

$$\begin{cases} G33 = \dfrac{(-R31 + 2 \cdot G32 + 2 \cdot R33 + 2 \cdot G34 - R35)}{4} \\ G44 = \dfrac{(-B42 + 2 \cdot G43 + 2 \cdot B44 + 2 \cdot G45 - B46)}{4} \end{cases} \quad (2)$$

$$\begin{cases} G33 = \dfrac{(-R13 + 2 \cdot G23 + 2 \cdot R33 + 2 \cdot G43 - R53)}{4} \\ G44 = \dfrac{(-B24 + 2 \cdot G34 + 2 \cdot B44 + 2 \cdot G54 - B64)}{4} \end{cases} \quad (3)$$

For the interpolation of R color (or R data), when a pixel of interest is a pixel associated with an R color filter (or R filter color), R data of the pixel is directly output (Expression (4) shown below). For the interpolation of R color (or R data) for a pixel associated with a G color filter (or G filter color), interpolation data are calculated by using Expression (5) shown below. For interpolation of R color (or R data) for a pixel associated with a B color filter (or B filter color), interpolation data are calculated by using Expression (6) shown below. For interpolation of R color (or R data), the same expression is used for the H-direction and V-direction.

For interpolation of B color (or B data), the same or similar scheme or method is used as that for interpolation on R color (or R data).

$$R33 = R33 \quad (4)$$

$$\begin{cases} R34 = \dfrac{((R33 - G33) + (R35 - G35))}{2} + G34 \\ R43 = \dfrac{((R33 - G33) + (R53 - G53))}{2} + G43 \end{cases} \quad (5)$$

-continued $$R44 = \dfrac{((R33 - G33) + (R35 - G35) + (R53 - G53) + (R55 - G55))}{4} + G44 \quad (6)$$

Figure 5:
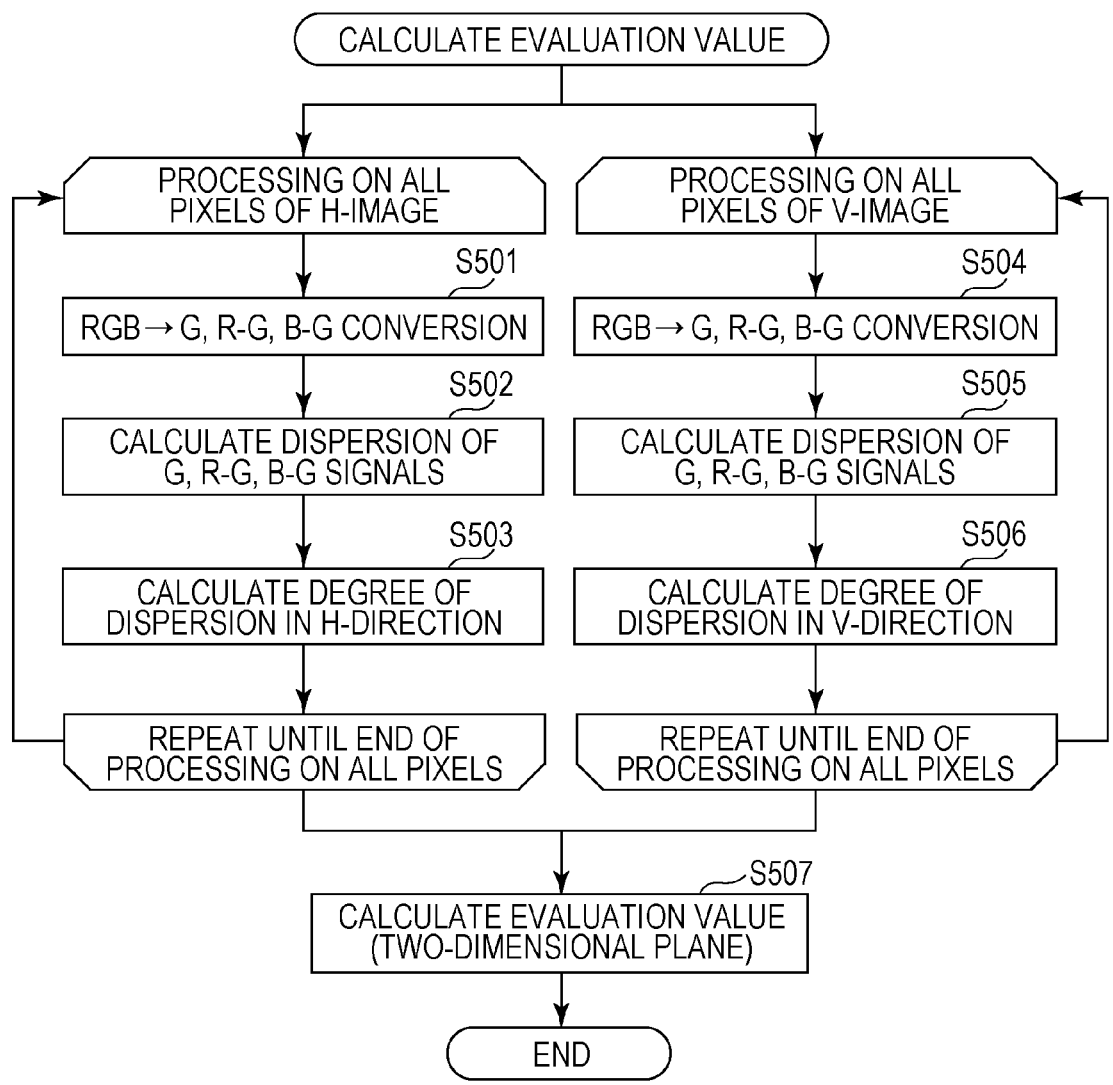
FIG. 5 is a flowchart illustrating at least one embodiment of an evaluation-value calculation process.

Next, an embodiment of an evaluation-value calculation process will be described with reference to a flowchart in FIG. 5.

Figure 2:
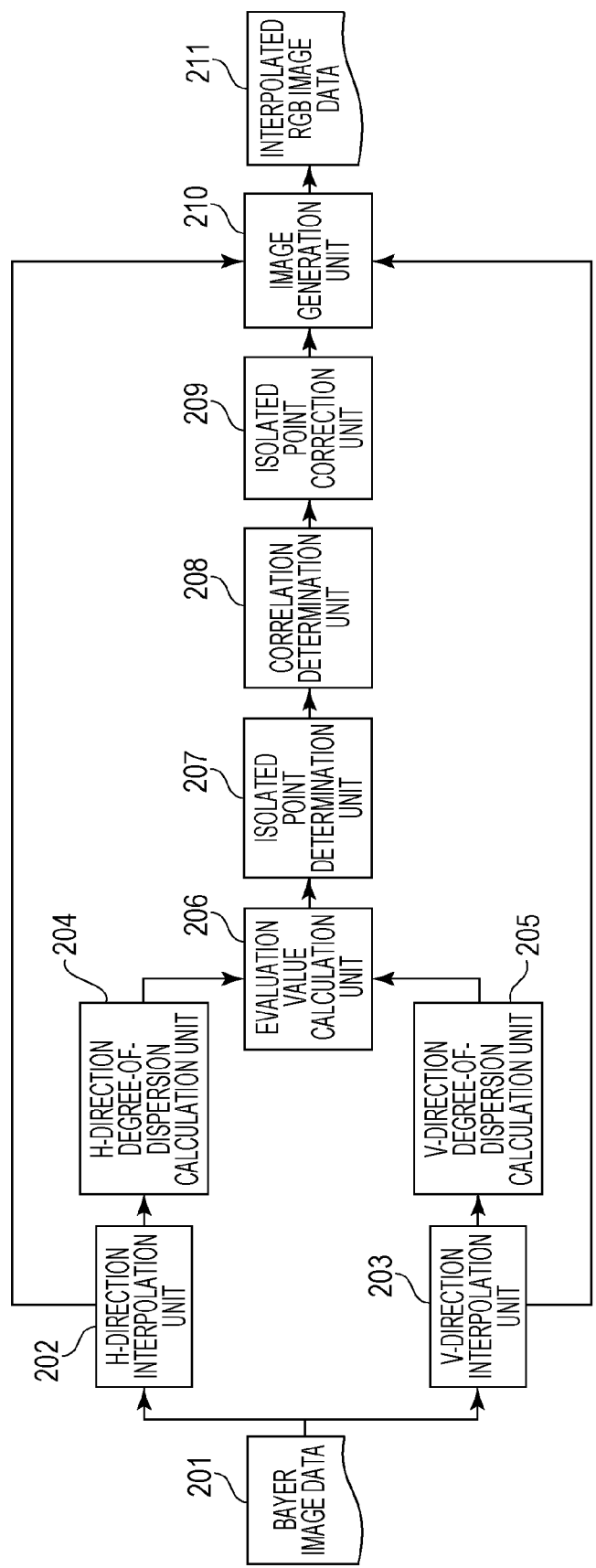
FIG. 2 is a block diagram illustrating a configuration of a demosaicing unit in the imaging apparatus according to at least the first and second embodiments.

The H-direction degree-of-dispersion calculation unit 204 in FIG. 2 converts H-direction RGB image data 202c in FIG. 3 acquired by interpolating a color missing in each pixel to a color signal (value) in a predetermined color space (S501). According to this embodiment, in order to calculate a degree of dispersion of color differences as a degree for homogeneity, G, R-G, and B-G color spaces are used. In this case, an L*a*b* uniform color space may be used instead of G, R-G, and B-G color spaces. However, because a conversion process to L*a*b* values may involve a great amount of calculation, a G signal may be used instead of L*, and R-G, B-G may be used as color difference signals instead of a* and b*.

Figure 6:
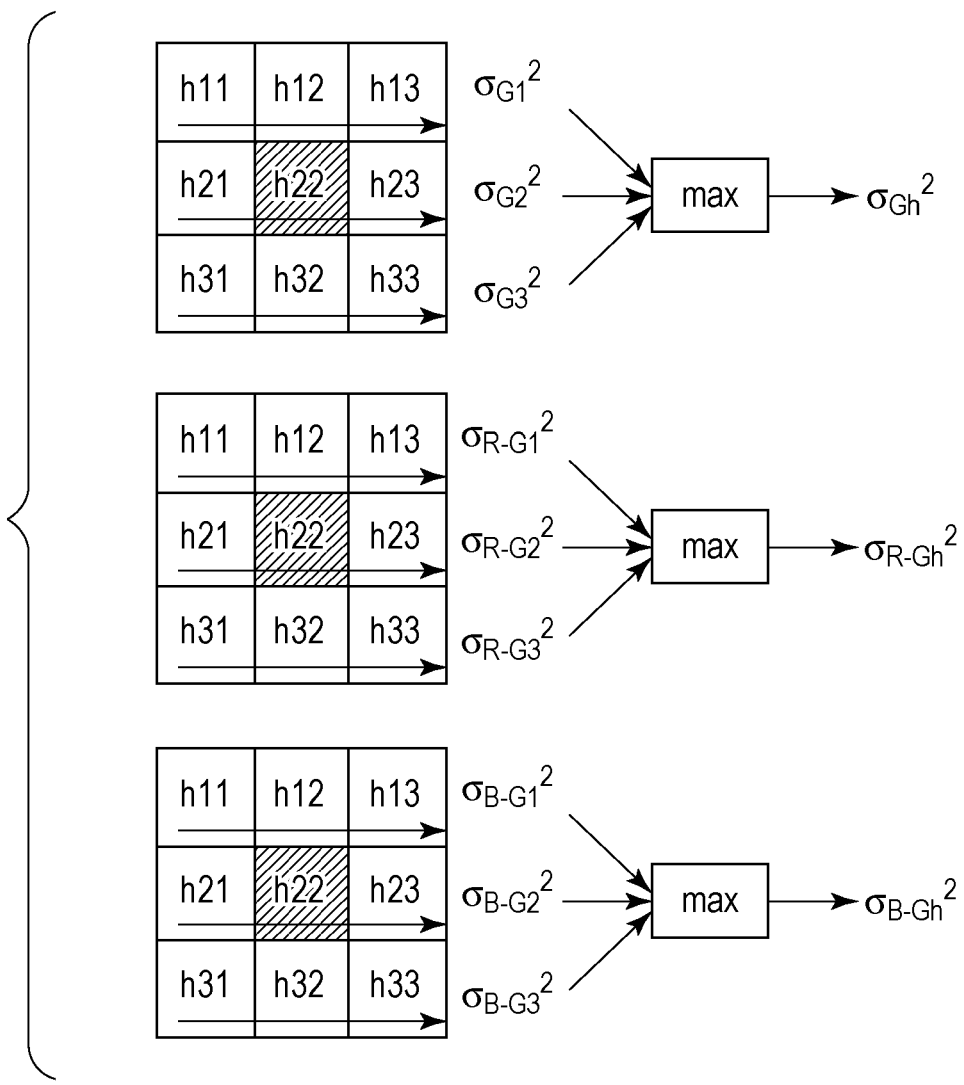
FIG. 6 is a diagram illustrating a 3×3 pixel region for explaining at least one embodiment of an evaluation-value calculation process.

Next, the H-direction degree-of-dispersion calculation unit 204 calculates a degree of dispersion for each of G, R-G, and B-G signal (S502). Here, pixels in a 3×3 region having a pixel of interest at its center are used for the calculation. Though pixels in a 3×3 region are used according to this embodiment, pixels in an area with a different size, such as in a 5×5 or 7×7 region, may be used. However, embodiments of the present inventions are not limited thereto. Instead of calculating dispersion by using a total of 9 pixels including a pixel of interest and adjacent 8 pixels, three pixels of h11 to h13, three pixels of h21 to h23, and three pixels of h31 to h33 aligned in the H-direction may be used to calculate three dispersions, as illustrated in FIG. 6. It is assumed that three dispersions of G are $\sigma G1^2$, $\sigma G2^2$, and $\sigma G3^2$, and a highest dispersion value $\sigma Gh^2$ among them is defined as a dispersion value of G. Similar processing to the calculation of the degree of dispersion of the G signal may be performed on the R-G signal and B-G signal to acquire an R-G dispersion value $\sigma_{R-Gh}^2$ and a B-G dispersion value $\sigma_{B-Gh}^2$.

Like the H-direction, the V-direction degree-of-dispersion calculation unit 205 uses three pixels of h11 to h31, three pixels of h12 to h32, and three pixels of h13 to h33 aligned in the V-direction to acquire a G dispersion value $\sigma_{Gv}^2$, an R-G dispersion value $\sigma_{R-Gv}^2$ and a B-G dispersion value $\sigma_{B-Gv}^2$ (S504 to S506).

The evaluation value calculation unit 206 calculates an evaluation value for each of the directions. A degree of dispersion in the H-direction is calculated by using Expression (7) below (S507). Like the H-direction, the V-direction degree-of-dispersion calculation unit 205 calculates a degree of dispersion in the V-direction by using Expression (8).

$$\sigma_h^2 = \sigma_{Gh}^2 + \sigma_{R-Gh}^2 + \sigma_{B-Gh}^2 \quad (7)$$

$$\sigma_v^2 = \sigma_{Gv}^2 + \sigma_{R-Gv}^2 + \sigma_{B-Gv}^2 \quad (8)$$

The H-direction degree-of-dispersion calculation unit 204 and evaluation value calculation unit 206 perform the processing in S501 to S503 on all pixels associated with the RGB image data 202c in the H-direction in FIG. 3. The V-direction degree-of-dispersion calculation unit 205 and evaluation value calculation unit 206 perform the processing in S504 to S506 on all pixels associated with the RGB image data 203c in the V-direction in FIG. 3.

Next, the evaluation value calculation unit 206 calculates evaluation values for the H-direction and the V-direction by using Expression (9) below.

$$C_h = \frac{\sigma_v^2}{\sigma_h^2 + \sigma_v^2} * A \qquad (9)$$

$$C_v = \frac{\sigma_h^2}{\sigma_h^2 + \sigma_v^2} * A$$

Here, Ch and Cv represent evaluation values based on degrees of dispersion. A is a positive constant.

By performing the processing above, the evaluation value Ch or Cv is calculated for each pixel, and, as a result, a two-dimensional plane with the evaluation values is generated (S507).

Figure 7:
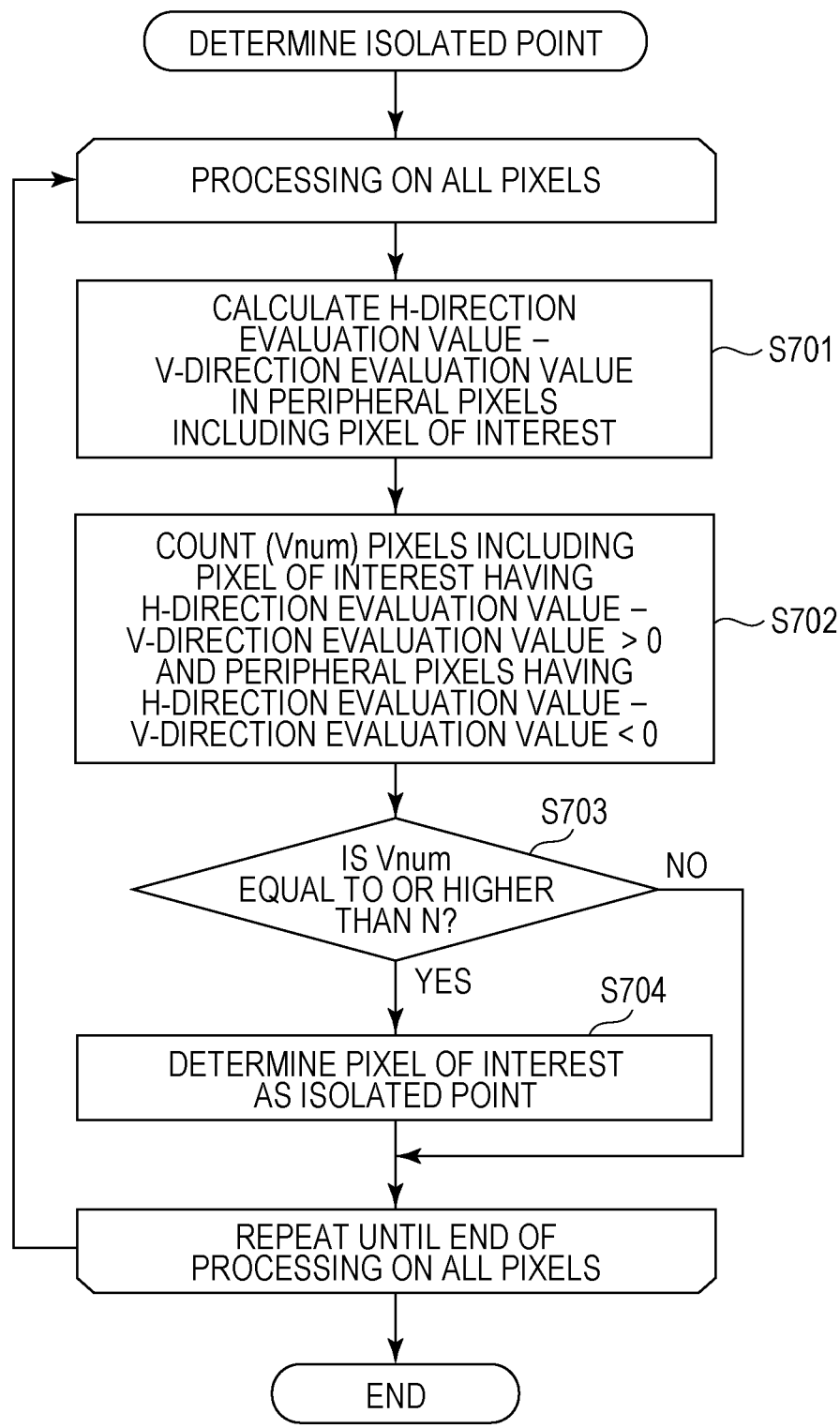
FIG. 7 is a flowchart illustrating an embodiment of an isolated-point determination process if a pixel of interest has a relationship of H-direction evaluation value−V-direction evaluation value>0.

Next, an embodiment of an isolated-point determination process will be described with reference to a flowchart in FIG. 7.

Figure 8:
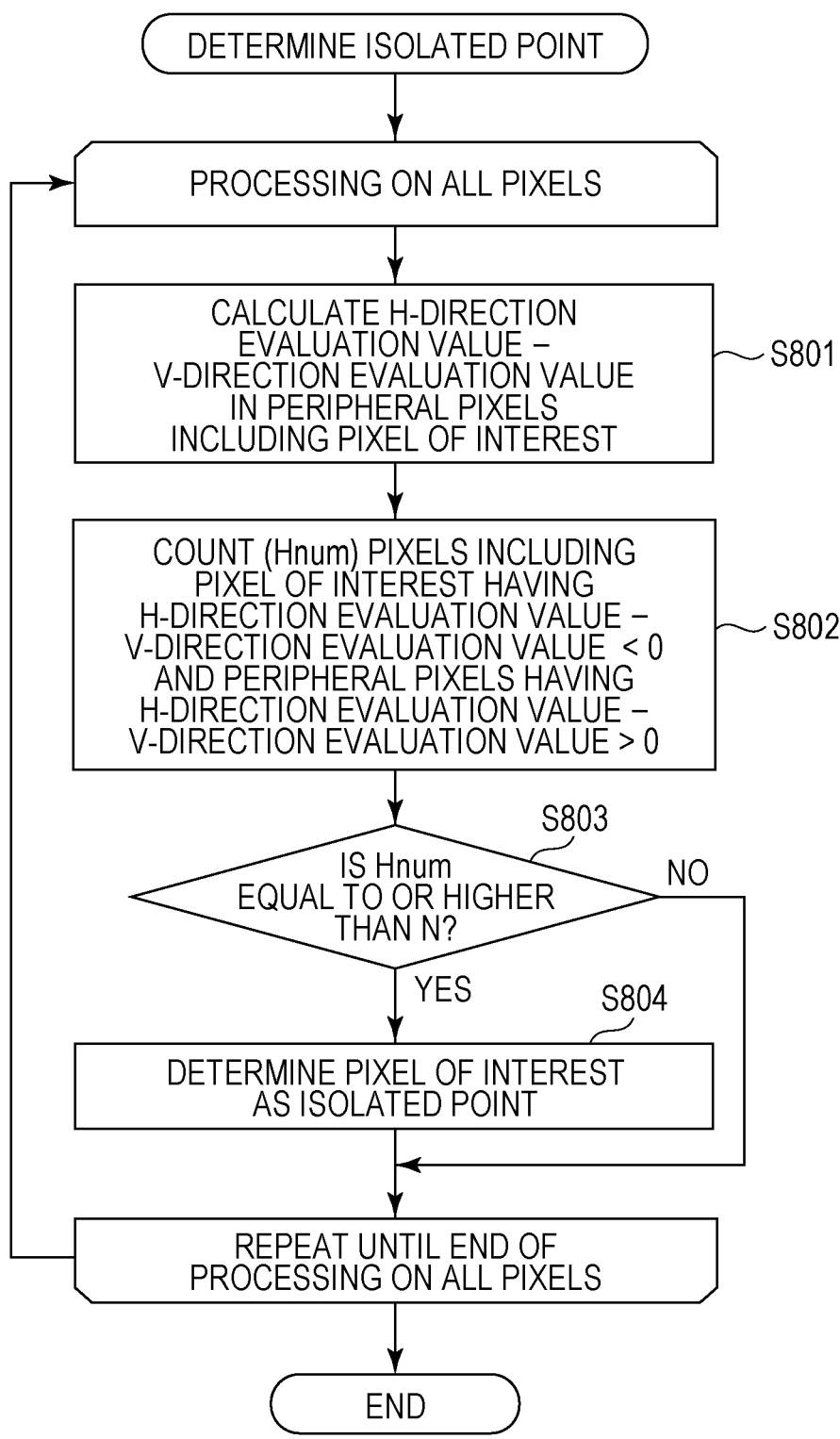
FIG. 8 is a flowchart illustrating an embodiment of an isolated-point determination process if a pixel of interest has a relationship of H-direction evaluation value−V-direction evaluation value<0.

The isolated point determination unit 207 determines an evaluation-value isolated point based on the evaluation values for the directions calculated by the evaluation value calculation unit 206. The isolated-point determination process will be described below in a case where a pixel of interest satisfies a relationship of H-direction evaluation value–V-direction evaluation value>0. The isolated point determination unit 207 calculates H-direction evaluation value–V-direction evaluation value for each of the pixel(s) of interest and peripheral pixels (S701). It is calculated by using pixels in a 3×3 region having the pixel of interest at its center. Though a 3×3 region is used according to this embodiment, embodiments of the present inventions are not limited thereto. For example, pixels in a 5×5 or 7×7 region may be used. From the calculation result, if the pixel of interest satisfies the relationship of H-direction evaluation value–V-direction evaluation value>0, the number of pixels having a relationship of H-direction evaluation value–V-direction evaluation value<0 is counted in the pixels surrounding the pixel of interest (S702). The number of counts is defined as Vnum, and whether Vnum is equal to or higher than a predetermined threshold value or not is determined (S703). As a result, if Vnum is equal to or higher than the predetermined threshold value, it is determined that the pixel of interest is an isolated point (S704). The isolated point determination unit 207 performs the processing in S701 to S704 on all pixels. As illustrated in FIG. 8, if the pixel of interest satisfies the relationship of H-direction evaluation value–V-direction evaluation value<0, the isolated point determination unit 207 counts the number of pixels satisfying the relationship of H-direction evaluation value–V-direction evaluation value>0 in the peripheral pixels (S801 to S803). If the result, Hnum, of the counting is equal to or higher than a predetermined threshold value, the pixel of interest is determined as an isolated point (S804).

Next, an embodiment of a correlation determination process will be described with reference to a flowchart in FIG. 9. The correlation determination unit 208 performs an evaluation-value correlation determination process based on evaluation values for the directions after the isolated-point determination process is performed.

The correlation determination unit 208 scans the pixel of interest and peripheral pixels in the horizontal direction as illustrated in FIG. 10 and calculates H-direction evaluation value–V-direction evaluation value for each of the pixels (e.g., when each pixel is scanned (as a pixel of interest in each iteration of the scan) for a plurality of pixels, at least one pixel of interest or a plurality of pixels of interest may be scanned) (S901). Though horizontal five pixels are used according to this embodiment, embodiments of the present inventions are not limited thereto. Seven or nine pixels may be used. From the calculation results, the number of serial pixels satisfying the relationship of H-direction evaluation value–V-direction evaluation value>0 is counted (S902). The counted number is defined as Hfnum, and whether Hfnum is equal to or higher than a predetermined threshold value or not is determined (S903). As a result, if Hfnum is equal to or higher than the predetermined threshold value, a correlation is determined in the horizontal direction about the pixel of interest (S904).

Though a correlation is determined by counting the number of serial positive pixel values according to this embodiment, a correlation may be determined if a calculated degree of dispersion of evaluation values is equal to or lower than a predetermined threshold value. The correlation determination unit 208 performs the processing in S901 to S904 on all of the pixels.

The correlation determination unit 208 similarly scans the pixel of interest and peripheral pixels in the vertical direction and calculates H-direction evaluation value–V-direction evaluation value for each of the pixels (S905). From the calculation result, the number of serial pixels satisfying the relationship of H-direction evaluation value–V-direction evaluation value>0 is counted (S906). The counted number is defined as Vfnum, and whether Vfnum is equal to or higher than a predetermined threshold value or not is determined (S907). As a result, if Vfnum is equal to or higher than a predetermined threshold value, a correlation is determined in the vertical direction about the pixel of interest (S908). The correlation determination unit 208 performs the processing in S905 to S908 on all pixels. Though a correlation is determined in each of the horizontal direction and the vertical direction according to this embodiment, a correlation in a diagonal direction may be determined.

Figure 9:
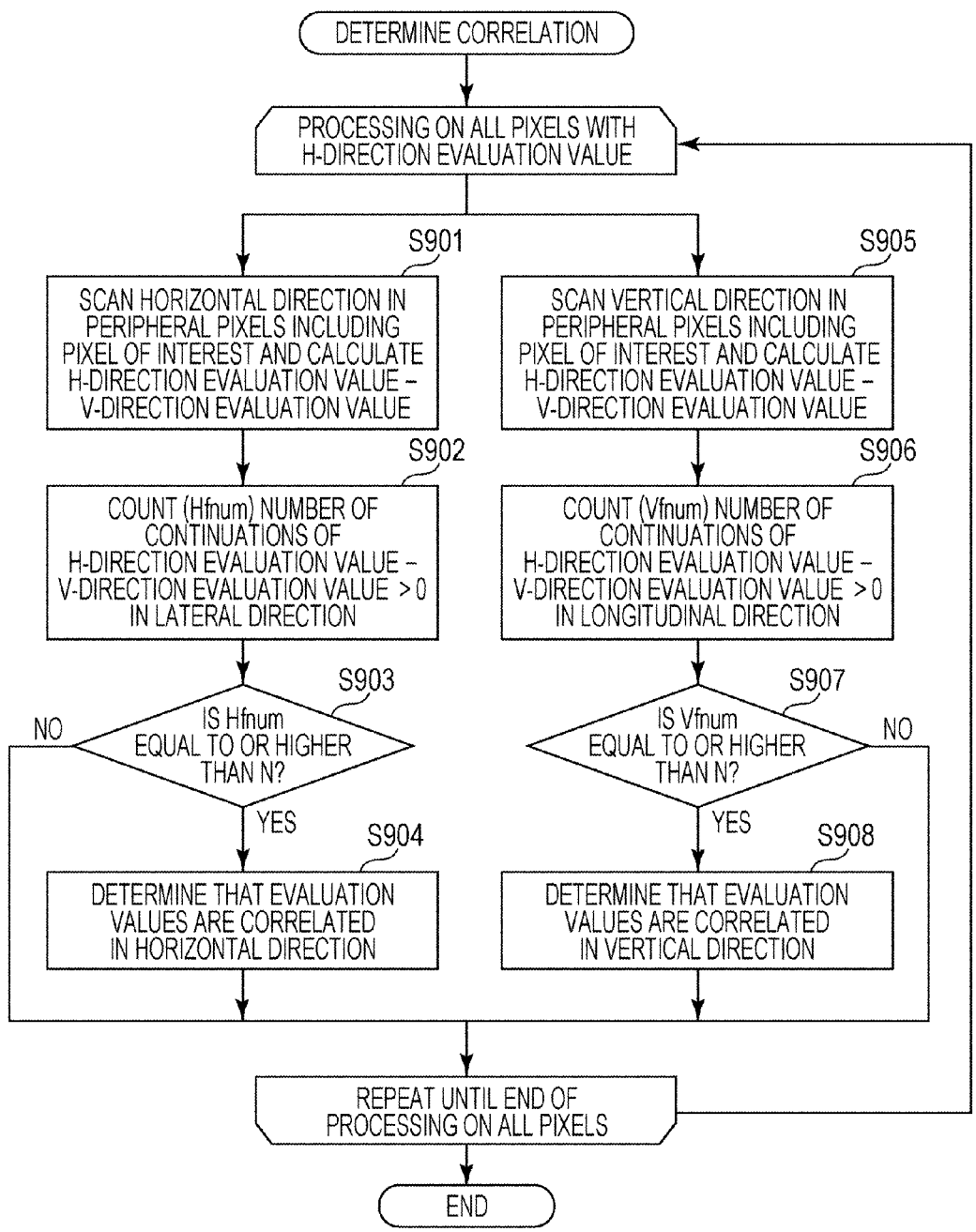
FIG. 9 is a flowchart illustrating an embodiment of a correlation determination process which handles pixel(s) with an H-direction evaluation value according to the first exemplary embodiment.

The correlation determination unit 208 replaces the H-direction evaluation value and the V-direction evaluation value acquired by the processing in S901, S902, S905 and S906 with each other and performs the processing illustrated in FIG. 9 on all of the pixels.

Figure 11:
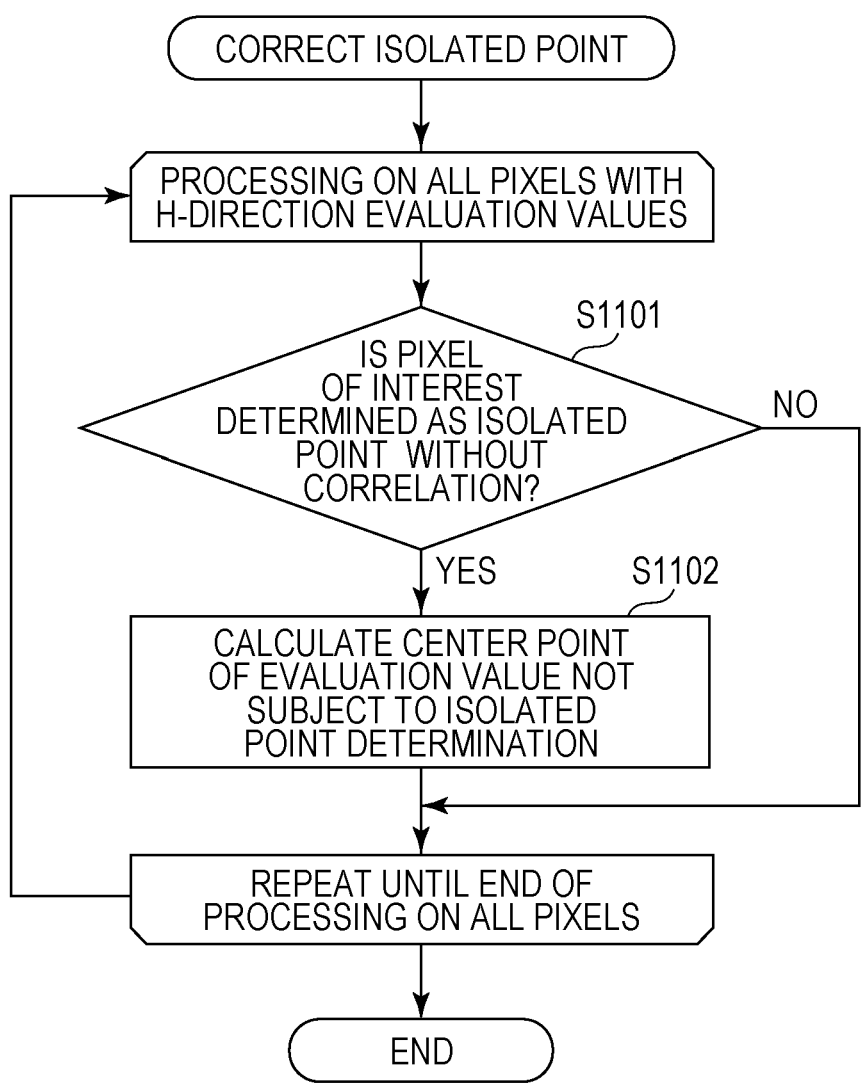
FIG. 11 is a flowchart illustrating an embodiment of an isolated-point correction process.

Next, an embodiment of an isolated-point correction process will be described with reference to a flowchart in FIG. 11.

The isolated point correction unit 209 uses the results of the isolated point determination and correlation determination on the evaluation values for the directions to correct the isolated point.

The isolated point correction unit 209 first determines whether the pixel of interest is determined as an isolated point by the isolated point determination unit 207 and a correlation is not determined by the correlation determination unit 208 (S1101). As a result, if it is satisfied, the isolated point correction unit 209 acquires a center value of evaluation values for pixels which are not determined as an isolated point in the peripheral pixels by the isolated point determination unit 207, and the acquired center value is handled as an evaluation value for the pixel of interest (S1102). FIG. 12 illustrates an example of the evaluation value calculation. In the example, the evaluation value for the pixel of interest h22 is acquired by using evaluation values for pixels h11, h12, h21, h23, and h33 which are not determined as an isolated point. Because the evaluation values are h11=1, h12=2, h21=3, h23=4, and h33=5, the center value is 3. Though the center value is handled as the correction result according to this embodiment, a mean value or a weighted filtering process may be used. The isolated point correction unit 209 performs the same processing as the processing in S1101 to S1102 for the V-direction evaluation value on all of the pixels, like the H-direction evaluation values.

The image generation unit 210 then selects one of a horizontal direction interpolation and a vertical direction interpolation based on the evaluation values calculated by the isolated point correction unit 209. Thus, the image generation unit 210 generates final RGB interpolated image data containing image data of R, G, B color components for all of the pixels and outputs the data as interpolated RGB image data 211 (demosaicing data).

Figure 13:
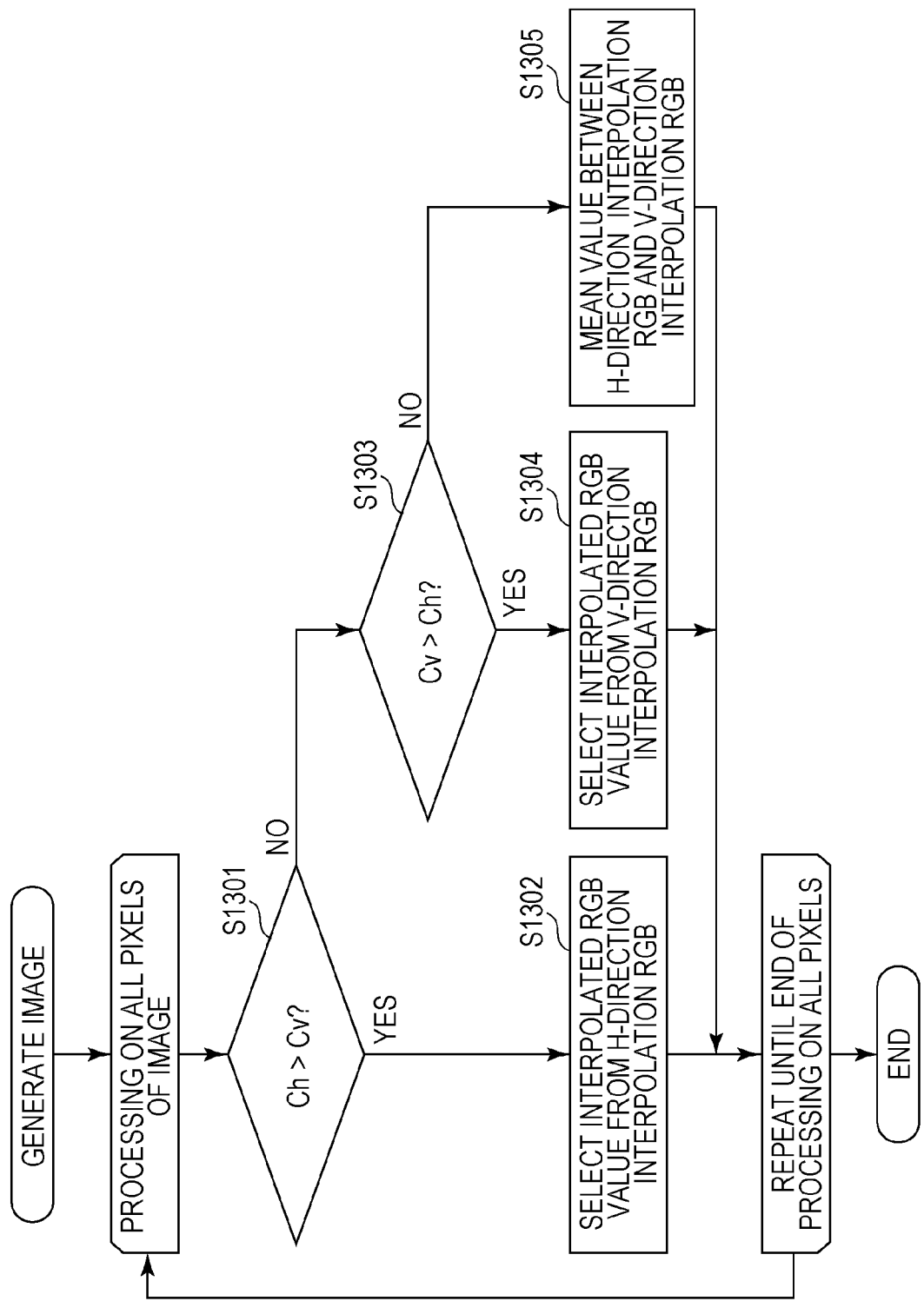
FIG. 13 is a flowchart illustrating an embodiment of an image generation process.

Next, an embodiment of a more specific method for generating an interpolated image will be described with reference to FIG. 13.

The image generation unit 210 first compares an evaluation value Ch for an H-direction interpolation and an evaluation value Cv for a V-direction interpolation with respect to all pixels and thus determines whether a relationship evaluation value Ch>evaluation value Cv is satisfied or not (S1301). As a result, if the relationship evaluation value Ch>evaluation value Cv is satisfied, the image generation unit 210 selects R, G, B interpolation data regarding the H-direction interpolation (S1302) and outputs them as interpolated RGB image data 211. If the relationship of evaluation value Ch>evaluation value Cv is not satisfied, whether a relationship of evaluation value Cv>evaluation value Ch is satisfied or not is determined next (S1303). As a result, if the relationship of evaluation value Cv>evaluation value Ch is satisfied, the image generation unit 210 selects R, G, B interpolation data regarding the V-direction interpolation (S1304) and outputs them as interpolated RGB image data 211. On the other hand, if the relationship of evaluation value Cv>evaluation value Ch is not satisfied, the image generation unit 210 calculates a mean value of R, G, B interpolation data regarding H-direction and V-direction interpolations for each of R, G, B colors (S1305) and outputs the calculation results as the interpolated RGB image data 211.

According to this embodiment, the determination is based on the magnitudes of an H-direction evaluation value and a V-direction evaluation value, and one of interpolation data on an H-direction interpolation, interpolation data on a V-direction interpolation, and a mean value of H-direction and V-direction interpolations is selected and is output as interpolated RGB image data. However, embodiments of the present inventions are not limited thereto. For example, whether a difference between an H-direction evaluation value and a V-direction evaluation value is equal to or higher than a threshold value or not may be determined. More specifically, if a relationship of evaluation value Ch−evaluation value Cv>threshold value A is satisfied, interpolation data on an H-direction interpolation may be selected. If a relationship of evaluation value Cv−evaluation value Ch>threshold value A is satisfied, interpolation data on a V-direction interpolation may be selected. In this case, excluding these two conditions, a calculation result of a weighted addition based on an H-direction evaluation value and a V-direction evaluation value may be output as interpolated RGB image data.

According to the first exemplary embodiment, a correlation between evaluation values of peripheral pixels about a pixel of interest is used for determining a part where a spurious resolution occurs. If no correlation exists between the evaluation values, the evaluation value for the pixel of interest is corrected by using the peripheral pixels about the pixel of interest. Thus, a spurious resolution caused by a mis-calculation of evaluation values may be corrected more appropriately.

Second Exemplary Embodiment

According to the first exemplary embodiment, a correlation is determined based on a result of determining whether a magnitude relationship between evaluation values for directions is continuous or not in peripheral pixels including a pixel of interest in the correlation determination unit 208. On the other hand, according to the second exemplary embodiment, a template map prepared in advance is used for the correlation determination.

The second exemplary embodiment of the present inventions will be described below with focus on differences from the first exemplary embodiment.

Because the configurations of at least one embodiment of an imaging apparatus and signal units of a demosaicing unit according to this exemplary embodiment are the same as those in the first exemplary embodiment described with reference to FIGS. 1 and 2, the descriptions on each of the units will be omitted. Processing flows according to a second exemplary embodiment are the same as those of the first exemplary embodiment excluding the correlation determination process.

Figure 14:
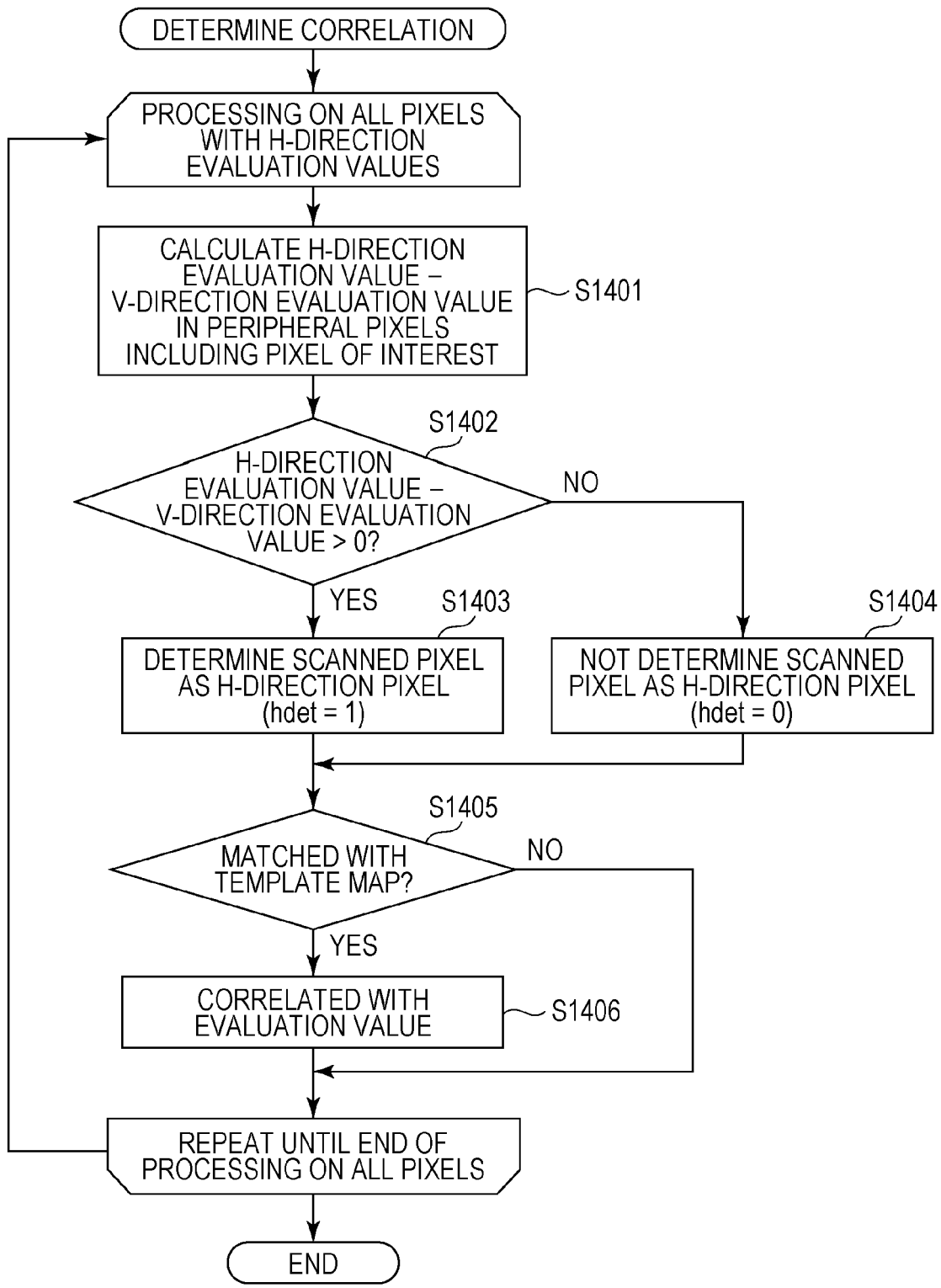
FIG. 14 is a flowchart illustrating an embodiment of a correlation determination process which handles pixel(s) with an H-direction evaluation value according to the second exemplary embodiment.

A correlation determination process according to this exemplary embodiment will be described with reference to a flowchart in FIG. 14. The correlation determination unit 208 performs a correlation determination process on an evaluation value based on an evaluation value for each direction after the isolated-point determination process. The correlation determination unit 208 first calculates H-direction evaluation value−V-direction evaluation value for each pixel in peripheral pixels including a pixel of interest (S1401). Next, from the calculation result, whether a relationship of H-direction evaluation value−V-direction evaluation value>0 is satisfied or not is determined (S1402). According to this exemplary embodiment, a 5×5 region is used. However, a 3×3 or 7×7 region (or other differently sized region) may be used instead. Indeed, embodiments of the present inventions are not limited thereto.

Figure 16:
FIG. 16 illustrates template map examples.

As a result, if the relationship of H-direction evaluation value−V-direction evaluation value>0 is satisfied, the correlation determination unit 208 determines H-direction pixels as scan pixels and defines hdet=1 (S1403). On the other hand, if a relationship of H-direction evaluation value−V-direction evaluation value≤0 is satisfied, the correlation determination unit 208 defines hdet=0 without determination of H-direction pixels as scan pixels (S1404). The correlation determination unit 208 uses the values hdet of the pixels and a predetermined template map prestored in the memory 112 to determine whether values are matched in the 5×5 region (or region of a different size) or not (S1405). FIG. 16 illustrates four examples representing data on template maps. According to this embodiment, a horizontal direction, a vertical direction, and two kinds of diagonal direction are used for template maps. However, embodiments of the present inventions are not limited thereto. Indeed, template maps may be used in one or more embodiments without limiting the directionality and number of template maps. As a result, if one of template maps illustrated in FIG. 16 is matched with a pixel value, it is determined that evaluation values for the pixel of interest have a correlation (S1406).

Figure 15:
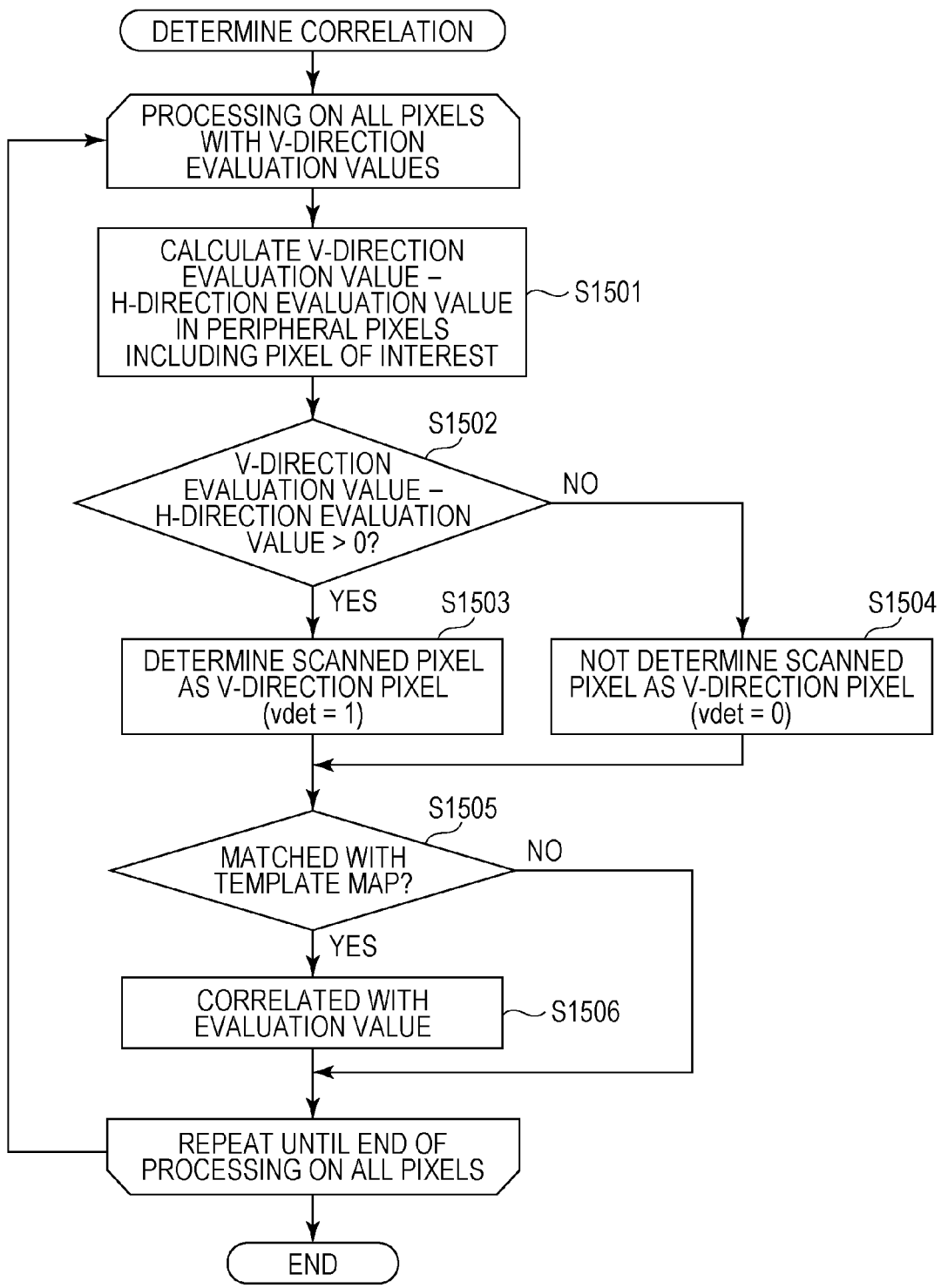
FIG. 15 is a flowchart illustrating an embodiment of a correlation determination process which handles pixel(s) with a V-direction evaluation value according to the second exemplary embodiment.

The correlation determination unit 208 performs the processing in S1401 to S1406 on all of the pixels. The correlation determination unit 208 performs the same processing as the processing in S1401 to S1406 on all pixels with the V-direction evaluation value, similarly to the H-direction evaluation value (S1501 to S1506 in FIG. 15).

Because the processing below is the same as that of the first exemplary embodiment, the description will be omitted. In this way, according to the second exemplary embodiment, a template map prepared in advance is used to perform the correlation determination. If no correlation exists between evaluation values, peripheral pixels of a pixel of interest are used for correcting evaluation values for the pixel of interest. Thus, like the first exemplary embodiment, a spurious resolution caused by a mis-calculation of evaluation values may be corrected appropriately.

Other Embodiments

Embodiments of the present inventions can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiments and/or that includes one or more circuits (e.g., application specific integrated circuit (ASIC)) for performing the functions of one or more of the above-described embodiments, and by a method or methods performed by the computer of the system or apparatus by, for example, reading out and executing the computer executable instructions from the storage medium to perform the functions of one or more of the above-described embodiments and/or controlling the one or more circuits to perform the functions of one or more of the above-described embodiments. The computer may comprise one or more processors (e.g., central processing unit (CPU), micro processing unit (MPU), etc.) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present inventions have been described with reference to exemplary embodiments, it is to be understood that the inventions are not limited to the disclosed exemplary embodiments. The scope of the following claims is to be accorded the broadest interpretation so as to encompass all such modifications and equivalent structures and functions.

This application claims the benefit of Japanese Patent Application No. 2014-091958, filed Apr. 25, 2014, which is hereby incorporated by reference herein in its entirety.

What is claimed is:

1. An image processing apparatus comprising:
a processor; and
a memory including instructions that, when executed by the processor, cause the processor to:
perform an interpolation process in each of a plurality of defined directions on a mosaic image to output interpolated images having undergone the interpolation process for each pixel, wherein the mosaic image is generated by an image pickup device which outputs an image signal corresponding to one of colors of a plurality of color filters for each pixel;
acquire an evaluation value representing a correlation for each of the defined directions for each of pixels;
correct the evaluation values for at least one pixel of interest based on the evaluation values for peripheral pixels of the at least one pixel of interest in a case where the evaluation values for the at least one pixel of interest and the evaluation values for the peripheral pixels satisfy a predetermined condition; and
output an image signal for each pixel based on the corrected evaluation values and the interpolated images.

2. The image processing apparatus according to claim 1, wherein the predetermined condition includes a condition that includes a condition that the evaluation value in a first defined direction is higher than the evaluation value in a second defined direction with respect to the at least one pixel of interest and the evaluation value in the second defined direction is higher than the evaluation value in the first defined direction with respect to the number of pixels equal to or higher than a threshold value of the peripheral pixels.

3. The image processing apparatus according to claim 1, wherein the predetermined condition includes a condition that no correlation exists in all of the plurality of defined directions with respect to the evaluation values for the at least one pixel of interest and the evaluation values for the peripheral pixels.

4. The image processing apparatus according to claim 3, wherein the instructions, when executed by the processor, further cause the processor to:
determine whether a correlation exists in one direction of the plurality of directions with respect to the evaluation values for the at least one pixel of interest and the evaluation values for the peripheral pixels.

5. The image processing apparatus according to claim 4, wherein the instructions, when executed by the processor, further cause the processor to:
determine that a correlation exists in one direction of the plurality of defined directions if a number of serial pixels with the evaluation values in a first defined direction higher than the evaluation values in a second defined direction is equal to or higher than a threshold value in one direction of the plurality of defined directions.

6. The image processing apparatus according to claim 1, wherein the instructions, when executed by the processor, further cause the processor to:
compare the evaluation values for the plurality of defined directions with respect to the at least one pixel of interest; and
output an image signal of the interpolated image having undergone the interpolation process in a defined direction having higher ones of the evaluation values among the image signals of the interpolated images having undergone the interpolation process for the plurality of defined directions.

7. An imaging apparatus comprising:
an image pickup device configured to output an image signal corresponding to one of colors of a plurality of color filters for each pixel;
a processor; and
a memory including instructions that, when executed by the processor, cause the processor to:
perform an interpolation process in each of a plurality of defined directions on a mosaic image to output interpolated images having undergone the interpolation process for each pixel, wherein the mosaic image is generated by the image pickup device;

acquire an evaluation value representing a correlation for each of the defined directions for each of pixels;

correct the evaluation values for at least one pixel of interest based on the evaluation values for peripheral pixels of the at least one pixel of interest in a case where the evaluation values for the at least one pixel of interest and the evaluation values for the peripheral pixels satisfy a predetermined condition; and output an image signal for each pixel based on the corrected evaluation values and the interpolated images.

8. An image processing method comprising:

performing an interpolation process in each of a plurality of defined directions on a mosaic image to output interpolated images having undergone the interpolation process for each pixel, wherein the mosaic image is generated by an image pickup device which outputs an image signal corresponding to one of colors of a plurality of color filters for each pixel;

acquiring an evaluation value representing a correlation for each of the defined directions for each of pixels;

correcting the evaluation values for at least one pixel of interest based on the evaluation values for peripheral pixels of the at least one pixel of interest in a case where the evaluation values for the at least one pixel of interest and the evaluation values for the peripheral pixels satisfy a predetermined condition; and outputting an image signal for each pixel based on the corrected evaluation values and the interpolated images.

9. A non-transitory computer-readable storage medium storing a computer-readable program for causing a processor to execute a method, the method comprising:

performing an interpolation process in each of a plurality of defined directions on a mosaic image to output interpolated images having undergone the interpolation process for each pixel, wherein the mosaic image is generated by an image pickup device which outputs an image signal corresponding to one of colors of a plurality of color filters for each pixel;

acquiring an evaluation value representing a correlation for each of the defined directions for each of pixels;

correcting the evaluation values for at least one pixel of interest based on the evaluation values for peripheral pixels of the at least one pixel of interest in a case where the evaluation values for the at least one pixel of interest and the evaluation values for the peripheral pixels satisfy a predetermined condition; and outputting an image signal for each pixel based on the corrected evaluation values and the interpolated images.

* * * * *